July 8, 1930.  H. E. BRICE  1,770,295
TRANSMISSION DEVICE
Filed Sept. 4, 1929  3 Sheets-Sheet 1

Henry E. Brice.
INVENTOR

BY Victor J. Evans
ATTORNEY

WITNESS J. J. NOVAK.

July 8, 1930. H. E. BRICE 1,770,295
TRANSMISSION DEVICE
Filed Sept. 4, 1929 3 Sheets-Sheet 2

Henry E. Brice.
INVENTOR

WITNESS J. J. NOVAK.

BY Victor J. Evans
ATTORNEY

July 8, 1930.  H. E. BRICE  1,770,295
TRANSMISSION DEVICE
Filed Sept. 4, 1929    3 Sheets-Sheet 3
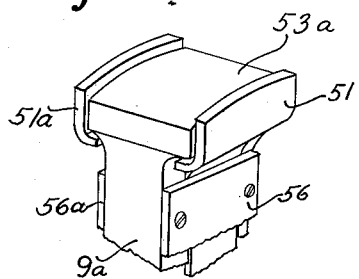
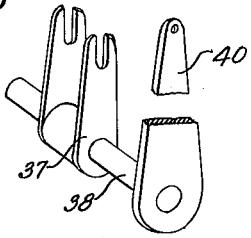
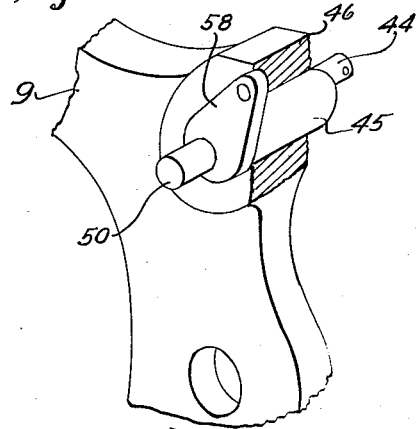
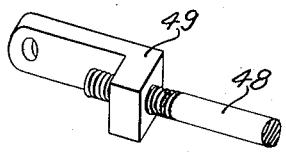
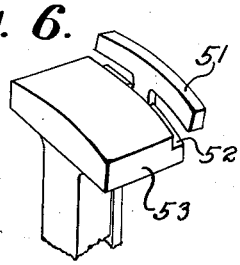
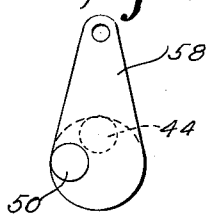
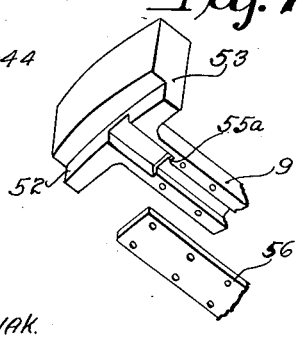
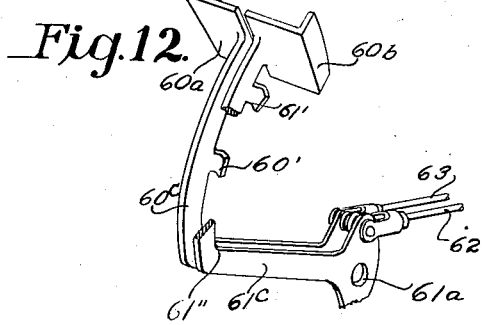

Patented July 8, 1930

1,770,295

UNITED STATES PATENT OFFICE

HENRY E. BRICE, OF NEW YORK, N. Y.

TRANSMISSION DEVICE

Application filed September 4, 1929. Serial No. 390,360.

This invention relates to improvements in gear transmissions, and its leading object is to provide a gear transmission with means whereby the transfer shaft may be maintained at a turning speed which will insure of smooth meshing of the shifted gears with the fixed gears, thereby avoiding grinding of teeth, delays in traffic, and the many operating troubles which result from imperfect gear meshing during the gear shifting operation.

Another object of the invention is the provision of a transmission gear set with a plurality of independently shiftable clutches for imparting synchronizing turning speed to the transfer shaft, and a variable pedal control for the clutches, which will enable the driver of a vehicle equipped with the improved gearing, or other party using the installation, to successively operate the clutches to cause the transfer shaft to turn at a synchronizing speed before meshing the gears when the shift lever moves from first gear position to second gear position, and subsequently to third gear position, and which will operate at the same time that the clutch is thrown out.

Fig. 5 is a detail view of a rocker shaft.

Fig. 6 is a perspective view of the main pedal and auxiliary presser member.

Fig. 7 is a similar view of the pedal with the keeper plate detached.

Fig. 8 is a perspective view of a modified pedal construction.

Fig. 9 is a perspective view, partly in section of a portion of the pedal lever and the rocker shaft carried thereby.

Fig. 10 is a detail perspective of the shifter, partly broken away.

Fig. 11 is a detail perspective of a connector.

Fig. 12 is a perspective view of a modified clutch lever, comprising twin clutch levers.

Figure 1:
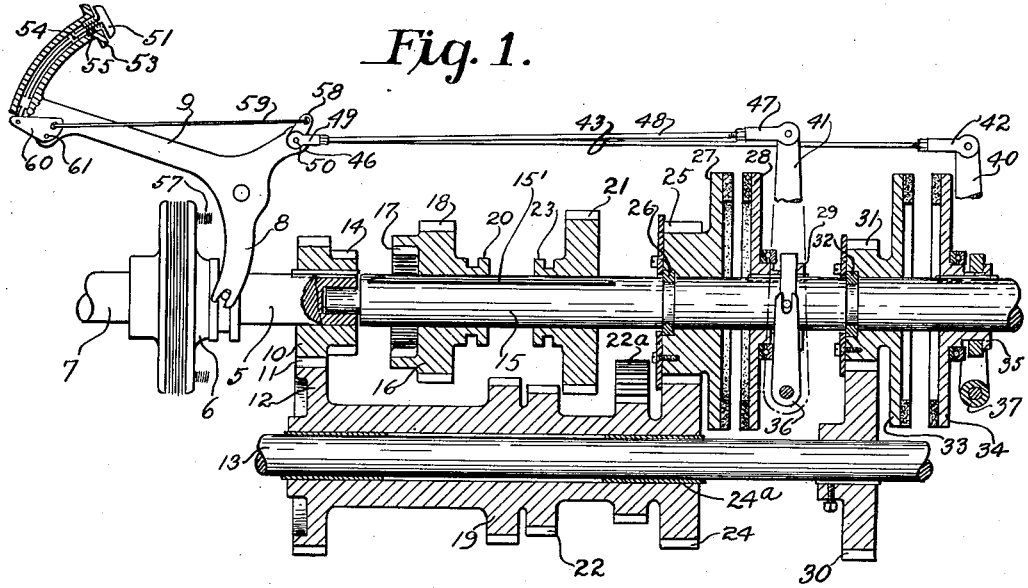
Fig. 1 is a longitudinal sectional view through a gear transmission embodying my invention.

Some manufacturers, in addition to the usual clutch, use what is called a clutch brake. This consists of a second clutch, smaller than the usual or main clutch. This second clutch usually contains a revolving friction body which is brought to a state of rest by contact with a resisting nonrotative friction body. The revolving friction body is connected to the same parts as are revolved by the main clutch. Two clutches are so connected that the descent of the foot pedal releases the main clutch but applies the second clutch. Thus the descending clutch pedal not only stops the motor from revolving certain parts, but also brings these parts to an immediate stop without waiting for their momentum to die out naturally.

When a car is equipped with such a clutch brake, the driver may easily shift any sliding gear into mesh as long as the car is standing still, because no matter which pair of gears he wishes to mesh, one gear of that pair is held non-rotative, through various connections, by the contact of the now still tires with the ground, and the gear to be meshed with it is brought to a state of rest by the clutch brake. If no clutch brake exists the driver must wait for the momentum of certain revolving parts to die naturally.

When the car is moving, however, and the driver wishes, after taking one pair of gears out of mesh, to slide another pair in mesh, not even an ordinary clutch brake will prevent clashing gears. This is due to the fact that the use of the clutch brake will stop the rotation of one of the gears of each of the pairs, while the other gear in each of these pairs is being revolved, through various connections, by the tires rolling on the ground. If in such a case no clutch brake exists, then one gear is revolved by the rolling wheels as described, and the other gear at first revolves with the speed of the motor, then its momentum dies, and if not meshed, it stops.

If, however, we take the previously-mentioned resisting body in the clutch brake, made operative each time the main clutch is made inoperative, and instead of having this body non-rotative as previously described, we connect it so it will also be revolved by the tires rolling on the ground, then for at least one pair of the gears which the driver may want to mesh, both members of that pair will be revolved by the tires rolling on the ground, as long as the clutch pedal remains down. Thus for one pair of gears both members will always revolve at the same speed, if desired, before meshing as after. Other pairs of gears would simply require a repetition of resisting bodies and a means of selecting one or the other. The innovation described in this paragraph, with some varations, is what this invention consists of.

In the present invention I have combined with a standard shift gear transmission set and its clutch, a combined auxiliary gear set and clutches, whereby the secondary or transfer shaft will be maintained at the turning speed favorable to smooth meshing of the shifted gear with the corresponding fixed gear to be engaged thereby.

The more closely the turning speed of the gear teeth on the secondary shaft corresponds to the turning speed of the gear teeth of the driven transmission shaft, the smoother will be the meshing of the engaged gears. The turning speed required for the secondary or transfer shaft during the shifting from second to third gear must be correspondingly relatively lower than the turning speed required when shifting from first gear to second gear. This, therefore, calls for a variable de-acceleration of the transfer shaft during the successive shifting operations. This variable speed regulation of the transfer shaft, by power transmitted from the driven transmission shaft only during the shifting of the gears, is what I have accomplished by the mechanism disclosed in this application.

Referring to the drawings in detail 5 designates a clutch shaft on which the movable clutch element 6 is mounted, to be shifted against the corresponding clutch element fixed on the engine shaft 7. The movable clutch element is shifted out of engagement by means of the well known rocker 8 from the clutch lever 9, which in this case embodies certain structural features having a definite functional relation to the service equipment disclosed.

The power shaft carries a fixed gear 10, which has gear-teeth 11 of a circular row to normally mesh with the teeth of the gear 12, which is fixed to the end of the transfer or secondary shaft 13. The gear 10 is also provided with a smaller circular row of gear teeth 14, which constitute the fixed high or third gear.

The driven transmission shaft 15 has its forward end engaged in a socket formed in the clutch shaft, and it is supported in suitable bearings not shown. On this transmission shaft the shift gear 16 is slidably mounted to engage the gear teeth 14; the shift gear having an internal gear ring 17 for this purpose. This gear 16 also carries an external gear 18, of larger diameter than the internal gear, which serves in the conventional arrangement as second or intermediate gear. This is adapted to be engaged with the second gear 19 on the secondary or transfer shaft. The shift gear 16 also carries a shift collar 20, which is engaged by the spanner of the gear shifting rod, as in the usual practice.

On the transmission shaft the first gear 21 is slidably mounted to engage the first gear, or low gear, 22, on the transfer or secondary shaft or the reverse idler gear 22A. This first gear is provided with the usual shift collar or hub 23, which is engaged by the spanner of the other shift rod.

The foregoing features are all old and well known, and are utilized in their standard relations to perform their old functions, and in connection with additional elements to perform new functions.

Mounted on the secondary or transfer shaft is a gear 24, which is keyed against relative rotation, as at 24$^a$, and which is in constant mesh with the gear 25 on the transmission shaft. This gear 25 is loosely mounted to rotate independently of the transmission shaft, against the thrust bearing 26. The loose gear 25 is equipped with a friction disc 27, which is engaged by the sliding friction disc 28 of the shiftable sleeve 29, which is keyed to its shaft.

Also mounted and fixed against rotation on the transfer or secondary shaft is the gear 30, which meshes with the gear 31 loosely mounted on the transmission shaft against thrust bearing 32. This loose gear 31 is equipped with a friction disc 33, which is to be engaged by the shiftable friction disc 34, which is shifted by means of the sleeve 35, which is keyed to its shaft. A forked spanner 36 engages the shift sleeve 29, while a similar forked spanner 37 engages the shift sleeve 35. Each of these spanners is made like the other, so one only will be described in detail. The forked spanner 37 (Fig. 10) is carried by a rock shaft 38, supported in bearings in the transmission housing, and on this rock shaft the lever 40 is mounted. A lever 41 is connected with the rock shaft of the forked spanner 36.

The upper end of the lever 40 carries a U-shaped connector 42, which is pivoted to the lever, and which is adjustably connected to the operating or shift rod 43, which extends forwardly to pivotally engage the eccentric stub shaft 44 of the rock shaft 45, which is mounted to rock in the bearing 46 of the clutch lever 9.

The other lever 41 is connected to the U-shaped connector 47, which is adjustably connected with the shift rod 48. The forward end of this shift rod is pivotally connected by the connector 49 with the eccentric stub shaft 50 of the rocker shaft 45.

When the clutch lever is depressed the rod 48 will be shifted, but a differential control of the rod 43 is obtained by means of the auxiliary pedal 51, which works in an edge recess 52 formed in the main pedal head 53 of the clutch lever. This pedal 51 is carried by the upper end of the connecting rod 54, which works in a guideway formed in the side of the clutch lever, against the coil spring 55, which engages the pedal head 51 at one end and, at the other end, a shoulder on the clutch lever at 55ª. A keeper plate 56 is secured to the side of the clutch lever to retain the connecting rod 54 in slidable relation in the guideway of the clutch lever. The spring 55 maintains the small pedal bar 51 in a normally elevated position over the pedal head 53. This pedal bar is shown to the right of the pedal head, so that the right side of the shoe of the driver will engage it and he can thus select, by foot contact, the particular pedal to operate.

The selective control of the shiftable friction disc is accomplished by the aid of the lever 58 carried by the rock shaft 45, and the connecting rod 59 which has its rear end pivoted to the lever 58 and its forward end pivoted to the rocker plate 60, which is pivoted at 61 to the clutch lever 9. This plate is pivoted to the lower end of the rod 54 which connects with the pedal bar 51.

When it is desired to shift from first to second gear the clutch is disengaged, in the usual manner, and the friction disc 28 is engaged with the friction disc 27, thus causing the transmission shaft to transmit power to the transfer shaft, through the coupling discs 27 and 28 and gears 24 and 25. This action will control the speed of the transfer shaft when the shift is made, and will impart to it, a turning speed synchronized with that of the transmission or secondary shaft.

When the clutch is disengaged, if pressure is applied only to the part 53, both rods 43 and 48 will be moved to the left, but owing to the fact that discs 27 and 28 are nearer to each other than the discs 33 and 34, discs 27 and 28 will become engaged by the act of the descending foot-pedal while discs 33 and 34 will still be apart.

If the driver first presses the pedal 51, however, this pressure, through the medium of parts 51, 54, 60, 59 and 58, will rock the rocker shaft 45 so that, instead of having the eccentric stud shaft 50 farther to the left than the eccentric stud shaft 44 as it is on the drawing, the rôles are reversed. A quarter revolution to the rocker shaft 45 has brought shaft 50 to the right and shaft 44 to the left so that now the discs 33 and 34 are close together and discs 27 and 28 are far apart, which is the reverse of the condition shown in Figure 1.

The continued descent of the two pedals together, at the same time as releasing the clutch, will pull both rods 43 and 48 to the left, but this time the discs 33 and 34 are the two which will clutch each other, the others being still apart.

The clutches 33 and 34 are normally spaced from each other twice the distance of the spacing of the clutches 27 and 28, so that the clutches 27 and 28 will first engage and prevent the clutches 33 and 34 from being engaged unless the pedal 51 is first pushed down as described.

Figure 2:
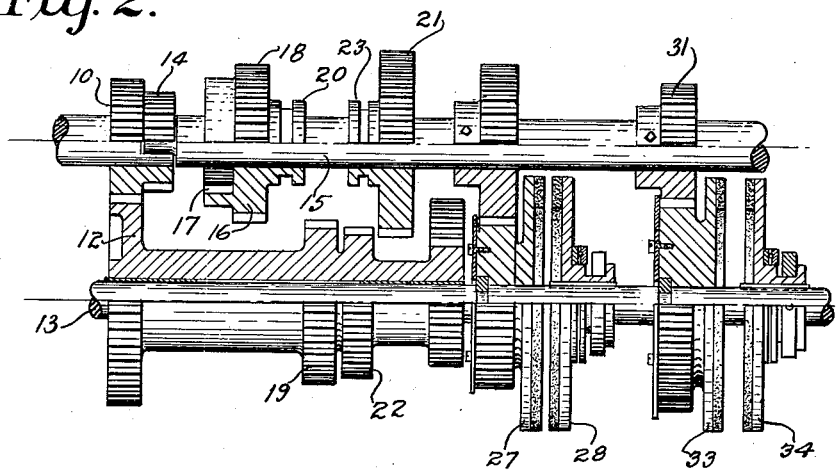
Fig. 2 is an elevation, with parts in section, view of a modified form.

In Fig. 2 the speed controlling clutches of the transmission are shown mounted upon the transfer shaft.

Figure 3:
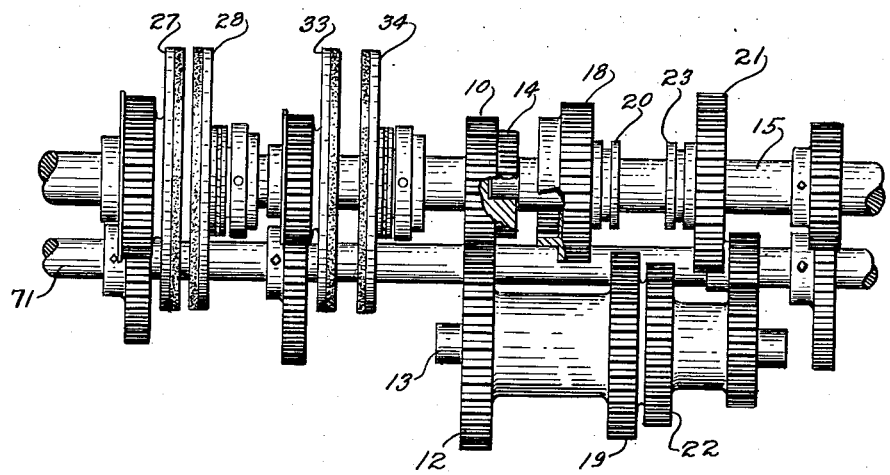
Fig. 3 is an elevation of another modified form.

Fig. 3 shows the additional clutches mounted upon the clutch shaft, revolved by an additional shaft 71.

Figure 4:
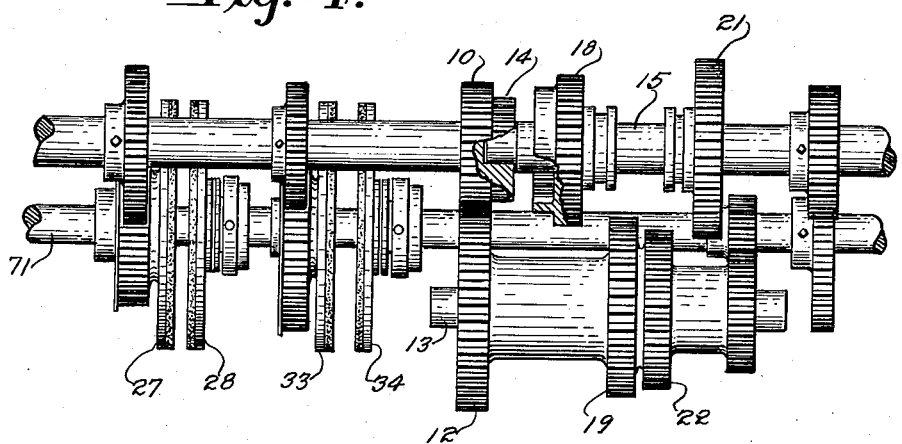
Fig. 4 is a similar view of still another modified form.

Fig. 4 shows the additional clutches mounted upon the additional shaft 71.

In Figs. 2, 3 and 4 the parts are identified by similar reference characters.

By the improvements disclosed a transmission is provided which enables a driver of an automobile to shift the transmission gears from one position to another, without causing traffic delays and without causing the cooperating gears to clash. In this way accidents to vehicles and persons can be materially reduced and the life of the transmissions and vehicles greatly extended.

In Fig. 8 a modified pedal is shown comprising the shank 9ª, the auxiliary pedal 51, held in place by the keeper plate 56, and a second auxiliary pedal 51ª, held in place by the plate 56ª. This construction would be used for controlling a transmission having three forward speeds or for shifting from second to first.

In Fig. 12 I show companion clutch levers 60ᶜ and 61ᶜ, which are mounted upon a common pivot 61ª. The lever 60ᶜ has a shift rod 63 pivoted thereto, and the lever 61ᶜ has a shift rod 62 pivoted thereto. The lever 60ᶜ carries a pedal head 60ª and the lever 61ᶜ carries a pedal head 60ᵇ, these two heads forming a divided pedal body. On the lever 61ᶜ a lug 61′ is provided, which is adapted to engage the lug 60′ on the lever 60ᶜ.

When the lever 60ᶜ is pressed independently of the lever 61ᶜ the lug 60′ will engage the portion 61″ and the lever 61ᶜ will then be shifted, also when the lever 61 is first pressed the lug 61′ will engage the lug 60′ and then the two levers will be rocked together. The rods 62 and 63 are connected with the auxiliary clutches 27 and 28 and 33 and 34, as previously described, and the two levers would be used in place of the lever 9.

The hereinbefore described construction admits of considerable modifications without departing from the invention; therefore, I do not wish to be limted to the precise arrangements shown and described, which are, as aforesaid, by way of illustration merely. In other words, the scope of protection contemplated is to be taken solely from the appended claims, interpreted as broadly as is consistent with the prior art.

I claim as new:—

1. A controlling lever for operating power clutches consisting of a lever mounted to rock and provided with an upstanding shank having a guide thereon, a connecting rod slidable through the guide, a pedal fixed to the head of the shank and provided with a recess, a pedal bar movable into said recess and connected to the rod, a rock plate on the side of the lever connected to the rod, a rock shaft journaled on the lever and provided with an eccentric stub shaft on end connected to the rock plate, and a stub shaft on the other end of the rock shaft eccentrically disposed thereon.

2. In combination; a power shaft, a second shaft, a third shaft, a clutch for transmitting power from the power shaft to the second shaft, a plurality of selective means for transmitting power from the second shaft to the third, a plurality of additional means each containing an additional clutch and each made operative by the engagement of its clutch to carry power from the third shaft to the second, and means connecting the first-mentioned clutch with each of the additional clutches and causing the disengagement of the first-mentioned clutch to selectively result in the engagement of one of the additional ones.

3. In combination; the power shaft of an automobile, a second shaft, a third shaft, a clutch for transmitting power from the power shaft to the second shaft, a plurality of selective means for transmitting power from the second shaft to the third, a plurality of additional means each containing an additional clutch and each made operative by the engagement of that clutch to carry power from the third shaft to the second, and selective foot-controlled means capable of driving the first-mentioned clutch out of engagement and one of the additional clutches into engagement.

4. In combination; the power shaft of an automobile, a clutch shaft, a transmission shaft, a clutch for connecting the power and clutch shafts with each other, a plurality of selective variable speed means each capable of transmitting power from the clutch shaft to the transmission shaft, a plurality of additional variable speed means each containing an additional clutch and each made operative by the engagement of its clutch to carry power from the transmission shaft to the clutch shaft, a clutch pedal, and selective means connecting this pedal with all clutches so the movement of the pedal will direct power to disengage the first-mentioned clutch at the same time as directing power to selectively engage one of the additional clutches, for the purpose of causing the transmission shaft to control the rotation of the clutch shaft during release of the first-mentioned clutch and previously to rendering operative one of the first-mentioned selective variable speed means.

5. In combination; a first shaft, a second shaft, a third shaft, a friction clutch capable of transmitting power between the first and second shafts, a plurality of selectively-controlled variable speed drives each capable of carrying power between the second shaft and the third shaft, a plurality of additional friction clutches, a plurality of variable speed drives each rendered operative by the operation of one of the additional clutches and each transmitting power, when operative, from the third shaft to the second shaft, a clutch lever, and means connecting this lever to all clutches so as to drive away from each other the co-acting friction elements of the first-mentioned clutch at the same time as bringing toward each other the co-acting friction elements of one of the additional clutches.

6. A power shaft, a driven shaft, an intermediate shaft, a friction clutch capable of transmitting power from the power shaft to the intermediate shaft, a coupling capable of connecting the intermediate and driven shafts together to force them to turn together, a parallel shaft, two gears on the parallel shaft, one of these gears in continual mesh with a gear on the driven shaft, the other in continual mesh with a gear on the intermediate shaft, a rotative connection between one of these four gears and its shaft allowing it to rotate independently of its shaft, a non-rotative connection between each of the other three gears and its shaft, a friction clutch element revolved by the rotatively-connected gear, a co-acting friction clutch element non-rotatively connected to the same shaft as this gear is rotatively connected to, a second clutch thus formed by these co-acting friction elements, a foot-pedal, and means connecting this foot-pedal to both clutches so the depression of the pedal will result in both the separation of the friction members of the first-mentioned clutch and in bringing together the co-acting friction members of the second clutch, for the purpose of causing all four mentioned gears to revolve with their shafts, so the driven shaft may control the rotation of the intermediate shaft before the coupling of these two shafts together.

7. A power shaft, a driven shaft, an intermediate shaft, a friction clutch capable of transmitting power from the power shaft to the intermediate shaft, a plurality of selective variable speed drives each capable of transmitting power from the intermediate shaft to the driven shaft, a parallel shaft, a plurality of variable speed drives each capable of carrying power back from the driven shaft to the intermediate shaft, and each containing two gears on the parallel shaft, one in continual mesh with a gear on the driven shaft and the other in continual mesh with a gear on the intermediate shaft, a rotative connection between one of these four gears and its shaft allowing it to rotate independently of that shaft, a non-rotative connection between each of the other three gears and its shaft, a friction clutch element revolved by the rotatively-connected gear, a co-acting friction clutch element non-rotatively connected to the shaft on which that gear is rotatively connected, a plurality of additional clutches thus formed by these pairs of co-acting clutch elements, each rendering operative during its own engagement one of the second-mentioned variable speed drives, a clutch pedal, means connecting this pedal with the first-mentioned clutch, and selective means connecting this pedal with each of the additional clutches causing the depression of the pedal to result both in separating the co-acting friction elements of the first-mentioned clutch and bringing together the co-acting friction elements of one of the additional clutches, for the purpose of rendering operative one of the second-mentioned variable speed drives to enable the driven shaft to control the intermediate shaft before rendering operative one of the first-mentioned variable speed drives.

8. In an automobile, a power shaft, a transfer shaft, a transmission shaft, a clutch for carrying power between the power shaft and the transfer shaft, in combination with selective variable speed drives for carrying power between the transfer shaft and the transmission shaft, selective sets of controlling means whereby the transmission shaft may control the speed of the transfer shaft before one of the variable speed drives is made operative, a clutch pedal containing a shank, a pivotal axis and a head, a plurality of contact parts on this pedal head for contact with the driver's foot, means whereby a limited amount of relative movement may be allowed between the contact parts, there being thus a limited amount of relative motion allowed between different parts of the pedal head, a plurality of relatively movable contact parts thus included in the pedal head, means connecting each relatively movable contact part with one set of controlling means, so that pressure applied to a contact part will result in the selection of its associated controlling set, and means whereby rocking the shank on its pivotal axis will release the clutch from engagement at the same time as rendering operative said previously selected set of controlling means.

In testimony whereof I hereby affix my signature.

HENRY E. BRICE.